United States Patent [19]

Genack

[11] Patent Number: 4,486,885
[45] Date of Patent: Dec. 4, 1984

[54] GENERATION OF SHORT AMPLIFIED PULSES OF LIGHT USING AN ABSORBING MEDIUM

[75] Inventor: Azriel Z. Genack, New York, N.Y.

[73] Assignee: Exxon Research and Engineering Co., Florham Park, N.J.

[21] Appl. No.: 596,072

[22] Filed: Apr. 3, 1984

Related U.S. Application Data

[63] Continuation of Ser. No. 263,050, May 13, 1981.

[51] Int. Cl.³ ............................................... H01S 3/10
[52] U.S. Cl. .......................................... 372/26; 372/25; 330/4.3; 350/354
[58] Field of Search ................... 372/25, 26, 97, 53, 372/5, 18, 19, 20; 330/4.3; 350/354

[56] References Cited

U.S. PATENT DOCUMENTS

| | | | |
|---|---|---|---|
| 3,581,230 | 5/1971 | Smith | 372/26 |
| 3,879,686 | 7/1975 | Milam et al. | 372/25 |
| 3,979,694 | 9/1976 | Goldhar et al. | 372/25 |
| 4,380,073 | 4/1983 | Wayne | 372/25 |

OTHER PUBLICATIONS

"Self-Phase Modulation and Short-Pulse Generation From Laser-Breakdown Plasmas", by Yablonovitch, Phys. Rev. A, vol. 10, No. 5, Nov. 1974.
"Electrical Triggering of an Optical Breakdown Plasma with Subnanosecond Jitter"; Kwok et al., App. Phys. Lett., vol. 27, No. 11, Dec. 1975.
"Mode Selection in Lasers"; Smith; Proc. of IEEE, vol. 60, No. 4, Apr. 1972, pp. 422–440.
"Observation of the Transparency of a Resonant Medium to Zero-Degree Optical Pulses"; Grieneisen et al.; Appl. Phys. Lett., vol. 21, No. 11, Dec. 1978.

Primary Examiner—William L. Sikes
Assistant Examiner—Léon Scott, Jr.
Attorney, Agent, or Firm—Arnold H. Krumholz

[57] ABSTRACT

A system is disclosed in which the phase of coherent light impinging on an absorbing cell is rapidly changed to produce a short amplified pulse of light.

10 Claims, 1 Drawing Figure

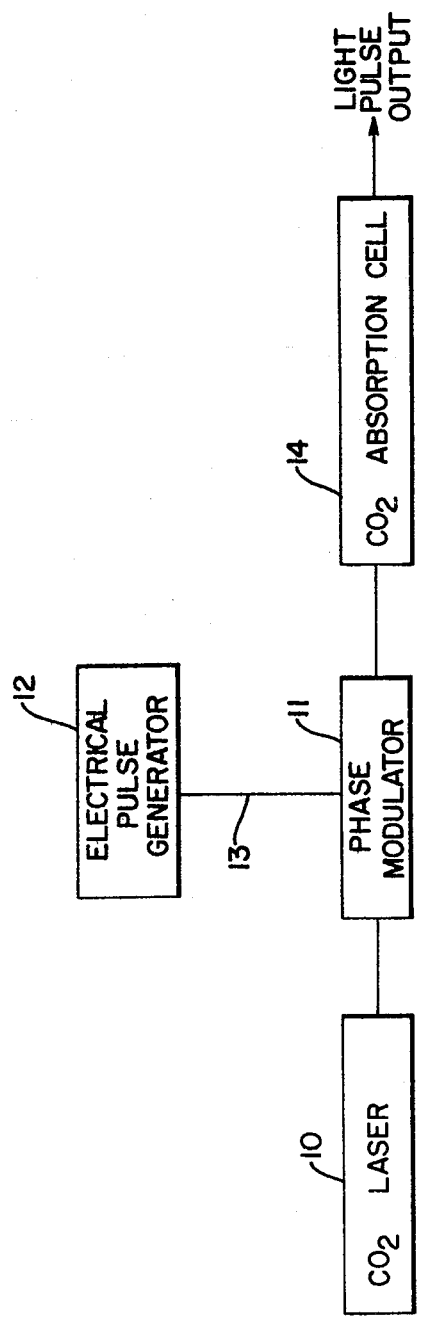

even for a non-abrupt 360° phase shift, pulses can be generated having a width equal to the rise time of the phase shift and having an amplitude up to four times the initial amplitude, depending on the rise time. For slower rise times, the pulse width is determined by the line width of the absorbing medium.

GENERATION OF SHORT AMPLIFIED PULSES OF LIGHT USING AN ABSORBING MEDIUM

This is a continuation of application Ser. No. 263,050 filed May 13, 1981.

FIELD OF THE INVENTION

This invention relates to the generation of short light pulses and particularly to the generation of short coherent light pulses.

BACKGROUND OF THE INVENTION

Coherent light pulses are employed to perform photo chemistry and also in laser communications systems. In both of these areas, as well as others, short pulses can be advantageous. Over a period of time people have developed systems for generating shorter and shorter pulses. Two papers published by E. Yablonovich [the first with J. Golbhar, Applied Physics Letters, 25, 520 (1970) and the second with H. S. Kwok, Applied Physics Letters, 30, 158 (1977)] disclose a system in which a coherent light pulse is generated by focussing laser light to break down the air through which it travels. The resulting plasma prevents further light from passing through, resulting in a coherent light pulse having a relatively slow rise time, but a fast fall time. This pulse is applied to an absorbing medium which absorbs the coherent light pulse, aligning the molecules in the medium with the field of the coherent light pulse. At the time of the sharp fall time terminating the coherent light pulse, the absorbing medium coherently gives up its stored energy, providing a short pulse having a pulse width related to the line width of the absorbing medium. The amplitude of the short pulse is approximately equal to the amplitude of the initial pulse incident upon the absorbing medium.

BRIEF DESCRIPTION OF THE INVENTION

In accordance with the teachings of this invention, it has been realized that short coherent light pulses can be generated without resorting to abrupt amplitude modulation. It has further been realized that such pulses can be generated with an amplitude up to four times as great as the incident radiation. It has been discovered that a CW laser beam having an abrupt 180° phase shift incident upon an absorbing medium results in a short pulse synchronized with the abrupt phase transition having an amplitude approximately four times the amplitude of the incident CW laser radiation.

The time duration of the pulse thus generated is related to the line width of the absorbing medium if the 180° phase shift occurs in a time short compared to the time related to the line width.

It has been found that the amplitude of the resulting pulse is proportional to the square of the sign of half the angle of the phase shift. Thus, the maximum amplitude occurs at 180° phase shift, while zero amplitude occurs at a 360° phase shift. Thus, a special case exists where a rapid 360° phase shift is imposed upon the incident radiation. In this case, if the 360° phase shift occurs in a time less than the time determined by the line width of the absorbing material, the width of the pulse in fact is controlled by the rise time of the 360° phase shift since the pulse will achieve a maximum amplitude at the 180° phase shift, and will be brought back to zero at 360°.

DESCRIPTION OF THE DRAWINGS

For a more detailed understanding of the invention, reference should be made to the following detailed description, and the sole FIGURE attached hereto, which is a schematic diagram of a system for generating short amplified pulses of light using an absorbing medium constructed in accordance with the teachings of this invention.

DETAILED DESCRIPTION OF THE INVENTION

Referring to the sole FIGURE, we see a carbon dioxide ($CO_2$) laser 10 operated in its CW mode to shine a CW light beam on a phase modulator 11 which is a cadmium telluride crystal situated in the path of the CW $CO_2$ laser beam in its phase modulating orientation. An electrical pulse generator 12 is connected to the phase modulator 11 by an electrical cable 13 which is the 50-ohm transmission line. The rise time of the pulses provided by the pulse generator 12 is typically one nanosecond. For faster rise times, a spark gap can be employed to increase the rise time to a hundred picoseconds. The phase modulator 11 passes the CW $CO_2$ laser radiation and imposes an additional predetermined phase shift when pulses from the pulse generator 12 are applied thereto. The light output of the phase modulator 11 is applied to an absorption cell 14 which is six meters long and filled with carbon dioxide ($CO_2$) at a temperature of 450° C. at a pressure of 100 torr.

In operation, the CW laser radiation from the $CO_2$ laser 10 passes through the phase modulator 11 and is absorbed by the $CO_2$ gas in the absorption cell 14, such that only $10^{-5}$ of the radiation incident upon the $CO_2$ absorption cell 14 passes therethrough. When a pulse is supplied by the pulse generator 12 via the transmission cable 13 to the phase modulator 11 having an amplitude which provides an abrupt 180° phase shift to the $CO_2$ laser radiation emitting therefrom a light pulse having an amplitude four times the radiation incident upon the $CO_2$ absorption cell 14 is emitted from the $CO_2$ absorption cell 14 as a pulse output. The width of the light pulse is approximately 150 picoseconds for the conditions described.

Thus, it is seen that a rejection ratio for the short light pulse is approximately 400,000. This is determined by taking the amplitude of the CW radiation output of the absorption cell 14 and dividing it into the amplitude of the light pulse. Since the amplitude of the light pulse is four times the incident radiation and the CW radiation passed by the $CO_2$ absorption cell 14 is $10^{-5}$ of the incident radiation, the resulting rejection ratio is 400,000.

It has been found that since the duration of the light pulse is controlled by the line width of the $CO_2$ gas in the cell 14 it is a function of temperature and pressure. Thus, for a cell such as set forth above at 450° C. with a pressure of 50 torr, a 300 picosecond pulse would be provided rather than the 150 picosecond pulse provided at 100 torr pressure.

It has been determined that the amplitude of the pulse emerging from the $CO_2$ absorption cell 14 has an amplitude depending upon the phase shift provided by the phase modulator 11. Thus, it has been determined that the amplitude is proportional to the square of the sign of half the angle of the phase shift. It can be seen from this relationship that the maximum amplitude occurs at 180°, while zero amplitude occurs at 0° and 360°. Thus, if a signal were applied to the phase modulator 11 to vary the phase from 0° through 180° to 360° phase shift, the pulse width of the output pulse from the absorption cell 14 would have a pulse width determined by the rise time of the electrical signal provided by the pulse generator 12 so long as that signal completed its excursion from 0° to 360° in a time less than the time determined by the line width. Thus, in the example given above where a 300 picosecond pulse is provided, a shorter pulse could be provided if the phase variation occurred from 0° to 360° in a time less than 300 picoseconds. As pointed out above, a spark gap could be employed to create a transition in that period of time.

While this invention has been described with respect to a particular embodiment thereof, numerous other embodiments will become obvious to those of ordinary skill in the art in light thereof.

What is claimed is:

1. Apparatus for generating short light pulses including:
   coherent radiation absorbing means for absorbing coherent radiation comprising an absorption cell containing an absorption medium having a predetermined line width;
   coherent radiation directing means for directing coherent radiation having a predetermined amplitude onto said coherent radiation absorbing means; and
   phase shifting means for shifting the phase of said coherent radiation while said coherent radiation directing means is directing said coherent radiation onto said coherent radiation absorbing means, said phase shifting means including operating means for operating said phase shifting means to shift the phase of said coherent radiation in a period of time less than the period of time determined by said line width of said absorbing medium, thereby producing a pulse of light from said coherent radiation absorbing means, said pulse of light having an amplitude which is greater than said predetermined amplitude.

2. The apparatus of claim 1 wherein said coherent radiation directing means is a laser.

3. The apparatus of claim 2 wherein said laser means comprises a $CO_2$ laser.

4. The apparatus of claim 2 wherein said laser is a cw laser.

5. The apparatus of claim 1 wherein said absorption medium is carbon dioxide.

6. The apparatus of claim 1 wherein said phase shifting means is a phase modulator.

7. The apparatus of claim 6 wherein said operating means comprises an electrical pulse generator for operating said phase modulator.

8. A method of generating short light pulses comprising the steps of generating a beam of coherent radiation having a predetermined amplitude, absorbing said coherent radiation in a coherent radiation absorption medium having a predetermined line width, and shifting the phase of said coherent radiation during said absorbing of said coherent radiation in said coherent radiation absorption medium in a period of time less than the period of time determined by said line width of said coherent radiation absorbing medium, so as to produce a pulse of light from said coherent radiation absorption medium, said pulse of light having an amplitude which is greater than said predetermined amplitude.

9. The method of claim 8 comprising shifting the phase of said coherent radiation so as to produce a 180° phase shift.

10. The method of claim 8 comprising shifting the phase of said coherent radiation so as to produce a 360° phase shift.

* * * * *